(12) United States Patent
Bender et al.

(10) Patent No.: US 8,656,016 B1
(45) Date of Patent: Feb. 18, 2014

(54) MANAGING APPLICATION EXECUTION AND DATA ACCESS ON A DEVICE

(71) Applicants: Research In Motion Limited, Waterloo (CA); QNX Software Systems Limited, Kanata (CA)

(72) Inventors: Christopher Lyle Bender, Kitchener (CA); Jung Hyun Cho, Davis (CA); Jason Paul Foy, Haywards Heath (GB); Sivakumar Nagarajan, Ottawa (CA)

(73) Assignees: BlackBerry Limited, Ontario (CA); QNX Software Systems Limited, Ontario (CA)

( * ) Notice: Subject to any disclaimer, the term of this patent is extended or adjusted under 35 U.S.C. 154(b) by 0 days.

(21) Appl. No.: 13/659,527

(22) Filed: Oct. 24, 2012

(51) Int. Cl.
*G06F 15/16* (2006.01)
(52) U.S. Cl.
USPC ................................. 709/225; 726/1
(58) Field of Classification Search
USPC ................................. 709/225; 726/1
See application file for complete search history.

(56) References Cited

U.S. PATENT DOCUMENTS

| | | | |
|---|---|---|---|
| 4,815,128 A | 3/1989 | Malek | |
| 4,837,812 A | 6/1989 | Takahashi et al. | |
| 4,945,556 A | 7/1990 | Namekawa | |
| 4,972,457 A | 11/1990 | O'Sullivan | |
| 4,991,197 A | 2/1991 | Morris | |
| 5,220,604 A | 6/1993 | Gasser et al. | |
| 5,408,520 A | 4/1995 | Clark et al. | |
| 5,606,594 A | 2/1997 | Register et al. | |
| 5,774,551 A | 6/1998 | Wu et al. | |
| 5,802,483 A | 9/1998 | Morris | |
| 5,826,265 A | 10/1998 | Van Huben et al. | |
| 5,850,515 A | 12/1998 | Lo et al. | |
| 5,864,765 A | 1/1999 | Barvesten | |
| 5,987,440 A | 11/1999 | O'Neil et al. | |
| 5,987,611 A | 11/1999 | Freund | |
| 6,052,735 A | 4/2000 | Ulrich et al. | |
| 6,088,693 A | 7/2000 | Van Huben et al. | |
| 6,105,132 A | 8/2000 | Fritch et al. | |
| 6,131,136 A | 10/2000 | Liebenow et al. | |
| 6,219,694 B1 | 4/2001 | Lazaridis et al. | |

(Continued)

FOREIGN PATENT DOCUMENTS

| | | |
|---|---|---|
| CA | 2505343 | 6/2010 |
| CN | 101523878 | 9/2009 |

(Continued)

OTHER PUBLICATIONS

Extended European Search Report issued in European Application No. 11188696.6 on Apr. 12, 2012; 7 pages.

(Continued)

*Primary Examiner* — David Lazaro
(74) *Attorney, Agent, or Firm* — Fish & Richardson P.C.

(57) ABSTRACT

Some aspects of what is described here relate to managing application execution and data access on a mobile device. A request to access data is received from an application associated with a first perimeter on a device. The data is associated with a second, different perimeter on the device and has a data type. It is determined, based on the data type, that a management policy associated with the first perimeter permits the application to access the data independent of a second, different management policy assigned to the second perimeter. Based on the determining, the application is provided access to the data.

24 Claims, 4 Drawing Sheets

(56) References Cited

U.S. PATENT DOCUMENTS

| | | |
|---|---|---|
| 6,233,446 B1 | 5/2001 | Do |
| 6,243,756 B1 | 6/2001 | Whitmire et al. |
| 6,253,326 B1 | 6/2001 | Lincke et al. |
| 6,285,889 B1 | 9/2001 | Nykanen et al. |
| 6,292,798 B1 | 9/2001 | Dockter et al. |
| 6,343,313 B1 | 1/2002 | Salesky et al. |
| 6,351,816 B1 | 2/2002 | Mueller et al. |
| 6,360,322 B1 | 3/2002 | Grawrock |
| 6,405,202 B1 | 6/2002 | Britton et al. |
| 6,412,070 B1 | 6/2002 | Van Dyke et al. |
| 6,490,289 B1 | 12/2002 | Zhang et al. |
| 6,516,421 B1 | 2/2003 | Peters |
| 6,647,388 B2 | 11/2003 | Numao et al. |
| 6,668,323 B1 | 12/2003 | Challener et al. |
| 6,745,047 B1 | 6/2004 | Karstens et al. |
| 6,748,543 B1 | 6/2004 | Vilhuber |
| 6,757,821 B1 | 6/2004 | Akiyama et al. |
| 6,772,350 B1 | 8/2004 | Belani et al. |
| 6,775,536 B1 | 8/2004 | Geiger et al. |
| 6,785,810 B1 | 8/2004 | Lirov et al. |
| 6,795,688 B1 | 9/2004 | Plasson et al. |
| 6,795,967 B1 | 9/2004 | Evans et al. |
| 6,886,038 B1 | 4/2005 | Tabbara et al. |
| 6,895,502 B1 | 5/2005 | Fraser et al. |
| 6,901,429 B2 | 5/2005 | Dowling |
| 6,957,330 B1 | 10/2005 | Hughes |
| 6,976,241 B2 | 12/2005 | Cruz et al. |
| 6,978,385 B1 | 12/2005 | Cheston et al. |
| 6,999,562 B2 | 2/2006 | Winick |
| 7,042,988 B2 | 5/2006 | Juitt et al. |
| 7,076,239 B2 | 7/2006 | Kirkup et al. |
| 7,076,797 B2 | 7/2006 | Loveland |
| 7,146,638 B2 | 12/2006 | Malcolm |
| 7,187,678 B2 | 3/2007 | Cunetto et al. |
| 7,246,374 B1 | 7/2007 | Simon et al. |
| 7,315,750 B2 | 1/2008 | Chou et al. |
| 7,330,712 B2 | 2/2008 | Kirkup et al. |
| 7,331,058 B1 | 2/2008 | Gladney |
| 7,400,878 B2 | 7/2008 | Hassan et al. |
| 7,574,200 B2 | 8/2009 | Hassan et al. |
| 7,721,087 B1 | 5/2010 | DiPasquo et al. |
| 7,734,284 B2 | 6/2010 | Adams et al. |
| 7,751,331 B1 | 7/2010 | Blair et al. |
| 7,765,185 B2 | 7/2010 | Rangadass |
| 7,793,355 B2 | 9/2010 | Little et al. |
| 7,869,789 B2 | 1/2011 | Hassan et al. |
| 7,886,053 B1 | 2/2011 | Newstadt et al. |
| 7,921,452 B2 | 4/2011 | Ridlon et al. |
| 8,074,078 B2 | 12/2011 | Brown et al. |
| 8,208,900 B2 | 6/2012 | Adler et al. |
| 2001/0047485 A1 | 11/2001 | Brown et al. |
| 2001/0056549 A1 | 12/2001 | Pinault et al. |
| 2002/0013815 A1 | 1/2002 | Obradovich et al. |
| 2002/0019944 A1 | 2/2002 | Kou |
| 2002/0031230 A1 | 3/2002 | Yu et al. |
| 2002/0087880 A1 | 7/2002 | Rhoades |
| 2002/0095414 A1 | 7/2002 | Barnett et al. |
| 2002/0095497 A1 | 7/2002 | Satagopan et al. |
| 2002/0112155 A1 | 8/2002 | Martherus et al. |
| 2002/0184398 A1 | 12/2002 | Orenshteyn |
| 2003/0005317 A1 | 1/2003 | Audebert et al. |
| 2003/0014521 A1 | 1/2003 | Elson et al. |
| 2003/0026220 A1 | 2/2003 | Uhlik et al. |
| 2003/0031184 A1 | 2/2003 | Cunetto et al. |
| 2003/0035397 A1 | 2/2003 | Haller et al. |
| 2003/0054860 A1 | 3/2003 | Chen |
| 2003/0061087 A1 | 3/2003 | Srimuang |
| 2003/0065676 A1 | 4/2003 | Gbadegesin et al. |
| 2003/0070091 A1 | 4/2003 | Loveland |
| 2003/0087629 A1 | 5/2003 | Juitt et al. |
| 2003/0093698 A1 | 5/2003 | Challener et al. |
| 2003/0120948 A1 | 6/2003 | Schmidt et al. |
| 2003/0126437 A1 | 7/2003 | Wheeler et al. |
| 2003/0163685 A1 | 8/2003 | Paatero |
| 2003/0167405 A1 | 9/2003 | Freund et al. |
| 2003/0177389 A1 | 9/2003 | Albert et al. |
| 2003/0226015 A1 | 12/2003 | Neufled et al. |
| 2003/0236983 A1 | 12/2003 | Mihm, Jr. et al. |
| 2004/0001101 A1 | 1/2004 | Trajkovic et al. |
| 2004/0083382 A1 | 4/2004 | Markham et al. |
| 2004/0097217 A1 | 5/2004 | McClain |
| 2004/0100983 A1 | 5/2004 | Suzuki |
| 2004/0121802 A1 | 6/2004 | Kim et al. |
| 2004/0177073 A1 | 9/2004 | Snyder et al. |
| 2004/0209608 A1 | 10/2004 | Kouznetsov et al. |
| 2005/0154935 A1 | 7/2005 | Jin |
| 2005/0164687 A1 | 7/2005 | DiFazio |
| 2005/0192008 A1 | 9/2005 | Desai et al. |
| 2005/0210270 A1 | 9/2005 | Rohatgi et al. |
| 2005/0213763 A1 | 9/2005 | Owen et al. |
| 2005/0245272 A1 | 11/2005 | Spaur et al. |
| 2006/0059556 A1 | 3/2006 | Royer |
| 2006/0070114 A1 | 3/2006 | Wood et al. |
| 2006/0090136 A1 | 4/2006 | Miller et al. |
| 2006/0129848 A1 | 6/2006 | Paksoy et al. |
| 2006/0129948 A1 | 6/2006 | Hamzy et al. |
| 2006/0149846 A1 | 7/2006 | Schuba |
| 2006/0156026 A1 | 7/2006 | Utin |
| 2006/0168259 A1 | 7/2006 | Spilotro et al. |
| 2006/0168395 A1 | 7/2006 | Deng et al. |
| 2006/0206931 A1 | 9/2006 | Dillaway et al. |
| 2006/0212589 A1 | 9/2006 | Hayer et al. |
| 2007/0019643 A1 | 1/2007 | Sahheen |
| 2007/0050854 A1 | 3/2007 | Cooperstein et al. |
| 2007/0073694 A1 | 3/2007 | Picault et al. |
| 2007/0156766 A1 | 7/2007 | Hoang et al. |
| 2007/0204153 A1 | 8/2007 | Tome et al. |
| 2007/0204166 A1 | 8/2007 | Tome et al. |
| 2007/0254631 A1 | 11/2007 | Spooner |
| 2007/0277127 A1 | 11/2007 | Carlson et al. |
| 2008/0002726 A1 | 1/2008 | Haung et al. |
| 2008/0081609 A1 | 4/2008 | Burgan et al. |
| 2008/0098237 A1 | 4/2008 | Dung et al. |
| 2008/0125146 A1 | 5/2008 | Bainbridge |
| 2008/0130524 A1 | 6/2008 | Volach et al. |
| 2008/0132202 A1 | 6/2008 | Kirkup et al. |
| 2008/0134347 A1 | 6/2008 | Goyal et al. |
| 2008/0222711 A1 | 9/2008 | Michaelis |
| 2008/0235041 A1 | 9/2008 | Cashdollar et al. |
| 2009/0070181 A1 | 3/2009 | Loeffen |
| 2009/0094668 A1 | 4/2009 | Corbin et al. |
| 2009/0178107 A1 | 7/2009 | Karjoth et al. |
| 2009/0181662 A1 | 7/2009 | Fleischman et al. |
| 2009/0254753 A1 | 10/2009 | De Atley et al. |
| 2009/0260052 A1 | 10/2009 | Bathula et al. |
| 2010/0024016 A1 | 1/2010 | Violleau et al. |
| 2010/0024020 A1 | 1/2010 | Baugher et al. |
| 2010/0081417 A1 | 4/2010 | Hickie |
| 2010/0088753 A1 | 4/2010 | Ayres et al. |
| 2010/0107215 A1 | 4/2010 | Bechtel et al. |
| 2010/0184440 A1 | 7/2010 | Mao et al. |
| 2010/0222097 A1 | 9/2010 | Gisby et al. |
| 2010/0278162 A1 | 11/2010 | Groux et al. |
| 2010/0281487 A1 | 11/2010 | Schneider et al. |
| 2010/0299376 A1 | 11/2010 | Batchu et al. |
| 2010/0299394 A1 | 11/2010 | Jania et al. |
| 2010/0319053 A1 | 12/2010 | Gharabally |
| 2010/0325221 A1 | 12/2010 | Cohen et al. |
| 2010/0325430 A1 | 12/2010 | Denninghoff |
| 2011/0010699 A1 | 1/2011 | Cooper et al. |
| 2011/0082808 A1 | 4/2011 | Beykpour et al. |
| 2011/0126214 A1 | 5/2011 | O'Farrell et al. |
| 2011/0145833 A1 | 6/2011 | De Los Reyes et al. |
| 2011/0179083 A1 | 7/2011 | Galloway et al. |
| 2011/0195698 A1 | 8/2011 | Pearce |
| 2011/0210171 A1 | 9/2011 | Brown et al. |
| 2011/0252240 A1 | 10/2011 | Freedman et al. |
| 2011/0314467 A1 | 12/2011 | Pearson |
| 2012/0005723 A1 | 1/2012 | Chaturvedi et al. |
| 2012/0023573 A1 | 1/2012 | Shi |
| 2012/0054853 A1 | 3/2012 | Gupta et al. |
| 2012/0079110 A1 | 3/2012 | Brown et al. |
| 2012/0079586 A1 | 3/2012 | Brown et al. |
| 2012/0079609 A1 | 3/2012 | Bender et al. |

(56) References Cited

U.S. PATENT DOCUMENTS

| | | | |
|---|---|---|---|
| 2012/0109826 A1 | 5/2012 | Kobres | |
| 2012/0144196 A1 | 6/2012 | Owen et al. | |
| 2012/0202527 A1 | 8/2012 | Obradovich et al. | |
| 2012/0214442 A1 | 8/2012 | Crawford et al. | |
| 2012/0214503 A1 | 8/2012 | Liu et al. | |
| 2012/0278863 A1 | 11/2012 | Wallace et al. | |
| 2012/0278904 A1 | 11/2012 | Perez et al. | |
| 2012/0291140 A1 | 11/2012 | Robert et al. | |
| 2012/0309344 A1 | 12/2012 | Ferrazzini et al. | |
| 2013/0097657 A1* | 4/2013 | Cardamore et al. | 726/1 |

FOREIGN PATENT DOCUMENTS

| | | |
|---|---|---|
| EP | 0605106 | 7/1994 |
| EP | 973350 | 1/2000 |
| EP | 1168141 | 1/2002 |
| EP | 1471691 | 10/2004 |
| EP | 1624428 | 2/2006 |
| EP | 1806674 | 7/2007 |
| EP | 1563663 | 10/2008 |
| EP | 2337300 | 6/2011 |
| GB | 2378780 | 2/2003 |
| GB | 2408179 | 5/2005 |
| GB | 2440015 | 1/2008 |
| JP | 2000-253241 | 9/2000 |
| JP | 2001-077811 | 3/2001 |
| JP | 2001-203761 | 7/2001 |
| JP | 2002-288087 | 10/2002 |
| WO | 96/25828 | 8/1996 |
| WO | 99/00814 | 2/1999 |
| WO | 00/59225 | 10/2000 |
| WO | 00/60434 | 10/2000 |
| WO | 2004017592 | 2/2004 |
| WO | 2004043031 | 5/2004 |
| WO | 2005045550 | 5/2005 |
| WO | 2006/130807 | 12/2006 |
| WO | 2009/012329 | 1/2009 |
| WO | 2009014975 | 1/2009 |
| WO | 2009021200 | 2/2009 |
| WO | 2012037656 | 3/2012 |
| WO | 2012037657 | 3/2012 |
| WO | 2012037658 | 3/2012 |

OTHER PUBLICATIONS

Office Action issued in U.S. Appl. No. 13/398,676 on Sep. 5, 2012; 21 pages.
Extended European Search Report issued in European Application No. 11186802.2 on Jan. 18, 2012; 7 pages.
Extended European Search Report issued in European Application No. 11186796.6 on Jan. 18, 2012; 8 pages.
Ferguson et al., U.S. Appl. No. 13/293,743, "Managing Cross Perimeter Access," filed Nov. 10, 2011.
Google Inc.; Android 2.3.4 User's Guide; May 20, 2011; 384 pages.
Microsoft Corp.; Microsoft Outlook 2010; Released Jul. 15, 2010; 27 pages.
Office Action issued in U.S. Appl. No. 13/293,743 on Feb. 14, 2013; 15 pages.
Office Action issued in U.S. Appl. No. 13/274,913 on Jan. 23, 2013; 22 pages.
International Search Report and Written Opinion issued in International Application No. PCT/CA2012/050797 on Feb. 5, 2013; 8 pages.
Office Action issued in U.S. Appl. No. 13/25,097 on Feb. 28, 2013; 18 pages.
Extended European Search Report issued in European Application No. 12189773.0 on Mar. 7, 2013; 8 pages.
International Search Report and Written Opinion of the International Searching Authority issued in International Application No. PCT/CA2012/050796 on Feb. 21, 2013; 13 pages.
Research in Motion, "BlackBerry Bridge App 2.1 and Blackberry PlayBook Tablet 2.1, Security Technical Overview"; Version: 2.1; Jul. 17, 2012; 43 pages.
Research in Motion, "BlackBerry Device Sercvice 6.1 and BlackBerry PlayBook Tablet 2.1, Security Technical Overview"; Version: 6.1; Sep. 17, 2012; 90 pages.
Office Action issued in U.S. Appl. No. 10/524,353 on Sep. 21, 2012; 16 pages.
Office Action issued in U.S. Appl. No. 13/098,456 on Sep. 13, 2012; 20 pages.
International Search Report and Written Opinion issued in International Application No. PCT/CA2011/001058 on Dec. 21, 2011; 9 pages.
XP002167366; Chen, Zhigun; "Java Card Technology for Smart Cards: Architecture and Programmer's Guide"; "Applet Firewall and Object Sharing," Internet citation; Jun. 2, 2000; <http://developer.java.sun.com/developer/Books/consumerproducts/javacard/ch09.pdf>.
Microsoft Office: Microsoft Outlook 2010 Product Guide; Microsoft Corp. published in 2010; 65 pages.
Windows 7 Product Guide; Microsoft Corp. published in 2009; 140 pages.
Extended European Search Report issued in European Application No. 12173030.3 on Nov. 22, 2012; 6 pages.
View messages with restricted permission sent by using IRM; Support/Outlook/Outlook 2007 Help and How-to. http://office.mircosoft.com/en-us/outlook-help/view-messages-with-restricted-permission-sent-by-using-irm-HA010246115.as . . . , pp. 1-2, retrieved on Feb. 12, 2010.
Send an e-mail message with restricted permission by using IRM; Support/Outlook/Outlook 2007 Help and How to. http://office.mircosoft.com/en-us/outlook-help/send-an-e-mail-message-with-restricted-permission-by-using-irm-HA01024780 . . . , pp. 1-4, retrieved on Feb. 12, 2010.
Introduction to using IRM for e-mail messages; Support/Outlook/Outlook 2007 Help and How-to. http://office.microsoft.com/en-us/outlook-help/introduction-to-using-irm-for-e-mail-message-HA010100366.aspx?CTT=5 . . . , pp. 1-6, retrieved on Feb. 12, 2010.
EP Application No. 12155659.1, Extended European Search Report dated Jan. 8, 2012.
Smartphone Security Beyond Lock and Wipe (Jun. 10, 2010): http://www.enterprisemobiletoday.com/article. php/3887006.
Basic Access Authentication (Jan. 23, 2010): http://en.wikipedia.org/wiki/Basic_access_authentication.
Digital Access Authentication (Dec. 23, 2009): http://en.wikipedia.org/wiki/Digest_access_authentication.
Cross-site request forgery (Nov. 30, 2008): http://en.wikipedia.org/wiki/Cross-site_request_forgery.
Extended European Search Report mailed Jul. 13, 2012, in corresponding European patent application No. 12153439.0.
"Customizing User Interaction in Smart Phones", Pervasive Computing, IEEE CS (2006) pp. 81-90 (URL: http://www.idi. ntnu.no/grupperlsu/bibliography/pdf/2006/Korpipaa2006pc.pdf).
"Supporting Mobile Privacy and Security through Sensor-Based Context Detection"", Julian Seifert, Second International Workshop on Security and Privacy in Spontaneous Interaction and Mobile Phone Use, May 17, 2010, Finland (U RL: http://www.medien.ifi.Imu.de/iwssi201 0/papers/iwssi-spmu201 O-seifert.pdf)".
EagleVision: A Pervasive Mobile Device Protection System, Ka Yang, Nalin Subramanian, Daji Qiao, and Wen sheng Zhang, Iowa State Unviersity (URL: http://www.cs.iastate.edu/-wzhang/papers/eagleVision.pdf), 2009.
"Using context-profiling to aid access control decisions in mobile devices"", Gupta et al., Nokia Research Center (URL: http://www.cerias.purdue.edu/assets/symposium/2011-posters1372-C48.pdf) Please refer to the I-page file named 372-C48.pdf", 2011.
Owen, Russell N., U.S. Appl. No. 10/524,353, filed Feb. 14, 2005; Title: System and Method for Secure Control of Resources of Wireless Mobile Communication Device.
International Application No. PCT/CA 03101245, International Search Report dated Dec. 23, 2003.
International Application No. PCT/CA 03101245, PCT Written Opinion, dated Apr. 23, 2004.
International Application No. PCT/CA 03101245, PCT Written Opinion, dated Sep. 20, 2004.

(56) References Cited

OTHER PUBLICATIONS

International Application No. PCT/CA 03101245, PCT International Preliminary Examination Report, dated Nov. 29, 2004.
"Owen, Russell N., U.S. Appl. No. 13/371,093, filed Feb. 10, 2012; Title: System and Method for Secure Control of Resources of Wireless Mobile Communication Devices Secure Control of Resources of Wireless Mobile Communication Device".
Int'l Search Report and the Written Opinion of the Int'l Searching Authority, or the Declaration of Appln. Serial No. PCT/CA2004/000250 of 02120/2004—12 pgs., 2004.
Int'l Search Report or the Declaration of Appln. Serial No. PCT/CA03/01679 of 10131/2003—6 pgs.
Red Hat: "Red Hat Linux 7.2—The Official Red Had Linux Reference Guide" Red Hat Linux Manuals, Online!, Oct. 22, 2001, XP002276029, pp. 145-155.
Sygate: "Sygate Personal Firewall Pro User Guide" Sygate Personal Firewall Pro User Guide version 2.02001, pp. 1-77, XP002248366, 2001.
Bender, Christopher Lyle; U.S. Appl. No. 13/074,136, filed Mar. 29, 2011; Title: Data Source Based Application Sandboxing.
"A Technical Overview of the Lucent VPN Firewall" White Paper Lucent Technologies, XX, XX, Aug. 2002, pp. 1-35, XP002271173, Chapter 1.
European Search Report of Appln. No. 04256690.1-2412, date of mailing Apr. 6, 2005—9 pgs.
Fourth Office Action. Chinese Application No. 200380105435.2. Dated: Aug. 3, 2011.
Patent Certificate. Indian Patent Application No. 1956/DELNP/2005. Dated: Oct. 31, 2003.
Certificate of Grant of Patent. Singapore Patent No. 112419. Dated: Apr. 30, 2007.
Certificate of Grant of Patent. Hong Kong Patent No. 1080315. Dated: Apr. 24, 2009.
Notice of Allowance. Canadian Application No. 2,505,343. Dated: Sep. 15, 2009.
Extended European Search Report issued in European Application No. 12189805.0 on Apr. 16, 2013; 6 pages.
Office Action issued in U.S. Appl. No. 11/118,791 on Sep. 25, 2006; 11 pages.
Office Action issued in U.S. Appl. No. 11/118,791 on Nov. 28, 2007; 12 pages.
Office Action issued in U.S. Appl. No. 11/118,791 on Mar. 30, 2007; 12 pages.
Office Action issued in U.S. Appl. No. 11/118,791 on May 20, 2008; 13 pages.
Office Action issued in U.S. Appl. No. 11/118,791 on Jan. 27, 2009; 16 pages.
Office Action issued in U.S. Appl. No. 11/118,791 on Apr. 8, 2009; 14 pages.
Advisory Action issued in U.S. Appl. No. 11/118,791 on Jun. 26, 2009; 8 pages.
Notice of Allowance issued in U.S. Appl. No. 11/118,791 on Jan. 20, 2010; 4 pages.
Office Action issued in U.S. Appl. No. 12/795,252 on Aug. 6, 2010; 6 pages.
Notice of Allowance issued in U.S. Appl. No. 12/795,252 on Dec. 17, 2010; 4 pages.
Notice of Allowance issued in U.S. Appl. No. 12/795,252 on Apr. 14, 2011; 4 pages.
Examiner's First Report issued in Australian Application No. 2005239005 on Oct. 15, 2007; 2 pages.
Examiner's Report No. 2 issued in Australian Application No. 2005239005 on Jul. 15, 2009; 2 pages.
Examiner's First Report issued in Australian Application No. 2009202857 on Nov. 5, 2010; 3 pages.
Office Action issued in Canadian Application No. 2,564,914 on May 3, 2010; 4 pages.
Office Action issued in Canadian Application No. 2,564,914 on Apr. 4, 2011; 2 pages.
First Office Action issued in Chinese Application No. 200580013730.4 on Mar. 27, 2009; 9 pages.
Second Office Action issued in Chinese Application No. 200580013730.4 on Dec. 12, 2010; 10 pages.
Third Office Action issued in Chinese Application No. 200580013730.4 on Mar. 8, 2011; 10 pages.
Notice of Allowance issued in Chinese Application No. 200580013730.4 on Jul. 28, 2011; 4 pages.
European Supplementary Search Report issued in European Application No. 05738877.9 on Sep. 13, 2007; 3 pages.
Communication Pursuant to Article 94(3) EPC issued in European Application No. 05738877.9 on Jan. 15, 2008; 4 pages.
Communication Pursuant to Article 94(3) EPC issued in European Application No. 05738877.9 on Jul. 15, 2009; 4 pages.
Communication under Rule 71(3) EPC issued in European Application No. 05738877.9 on Sep. 17, 2010; 41 pages.
First Examination Report issued in Indian Application No. 6068/DELNP/2006 on Jun. 3, 2010; 2 pages.
Notice of Reasons for Rejection issued in Japanese Application No. 2007-509840 on Jun. 15, 2009; 5 pages.
Notice of Allowance issued in Japanese Application No. 2007-509840 on Jan. 25, 2010; 3 pages.
Notice Requesting Submission of Opinion issued in Korean Application No. 10-2006-7025081 on Nov. 16, 2007; 10 pages.
Notice of Decision of Final Rejection issued Korean Application No. 10-2006-7025081 on Jun. 18, 2008.
Trial Decision issued in Korean Application No. 10-2006-7025081 on Jul. 27, 2009; 10 pages.
Notice of Decision for Patent issued in Korean Application No. 10-2006-7025081 on Aug. 7, 2009; 3 pages.
International Search Report issued in International Application No. PCT/CA2005/000652 on Aug. 17, 2005; 9 pages.
International Preliminary Report on Patentability under Chapter I issued in International Application No. PCT/CA2005/000652 on Nov. 9, 2006; 6 pages.
Office Action issued in U.S. Appl. No. 13/722,213 on May 22, 2013; 8 pages.
Office Action issued in Canadian Application No. 2,769,646 on Jun. 5, 2012; 3 pages.
Office Action issued in Canadian Application No. 2,769,646 on Oct. 22, 2012; 2 pages.
International Search Report and Written Opinion of the International Searching Authority issued in International Application No. PCT/CA2011/050707 on Jan. 18, 2012; 7 pages.
International Preliminary Report on Patentability issued in International Application No. PCT/CA2011/050707 on May 30, 2013; 4 pages.
Office Action issued in U.S. Appl. No. 13/25,097 on Sep. 10, 2013; 21 pages.
Office Action issued in U.S. Appl. No. 13/293,743 on Sep. 20, 2013; 19 pages.
Office Action issued in U.S. Appl. No. 13/274,913 on Jul. 16, 2013.
Office Action issued in U.S. Appl. No. 13/098,456 on Apr. 17, 2013; 31 pages.
Office Action issued in U.S. Appl. No. 13/098,456 on Sep. 27, 2013; 28 pages.
Communication Pursuant to Article 94(3) EPC issued in European Application No. 11188696.6 on Jul. 9, 2013; 4 pages.

* cited by examiner

MANAGING APPLICATION EXECUTION AND DATA ACCESS ON A DEVICE

TECHNICAL FIELD

This disclosure relates to managing execution of applications and access to data on a device.

BACKGROUND

Communication devices may include data, applications, and network resources, accessibility to which is controlled by security protocols. For example, user accounts, administration rights, password protection, database management, and others may be managed by or otherwise associated with different entities (e.g., an enterprise, an individual, etc.).

DESCRIPTION OF THE DRAWINGS

Like reference numbers and designations in the various drawings indicate like elements.

DETAILED DESCRIPTION

Figure 1:
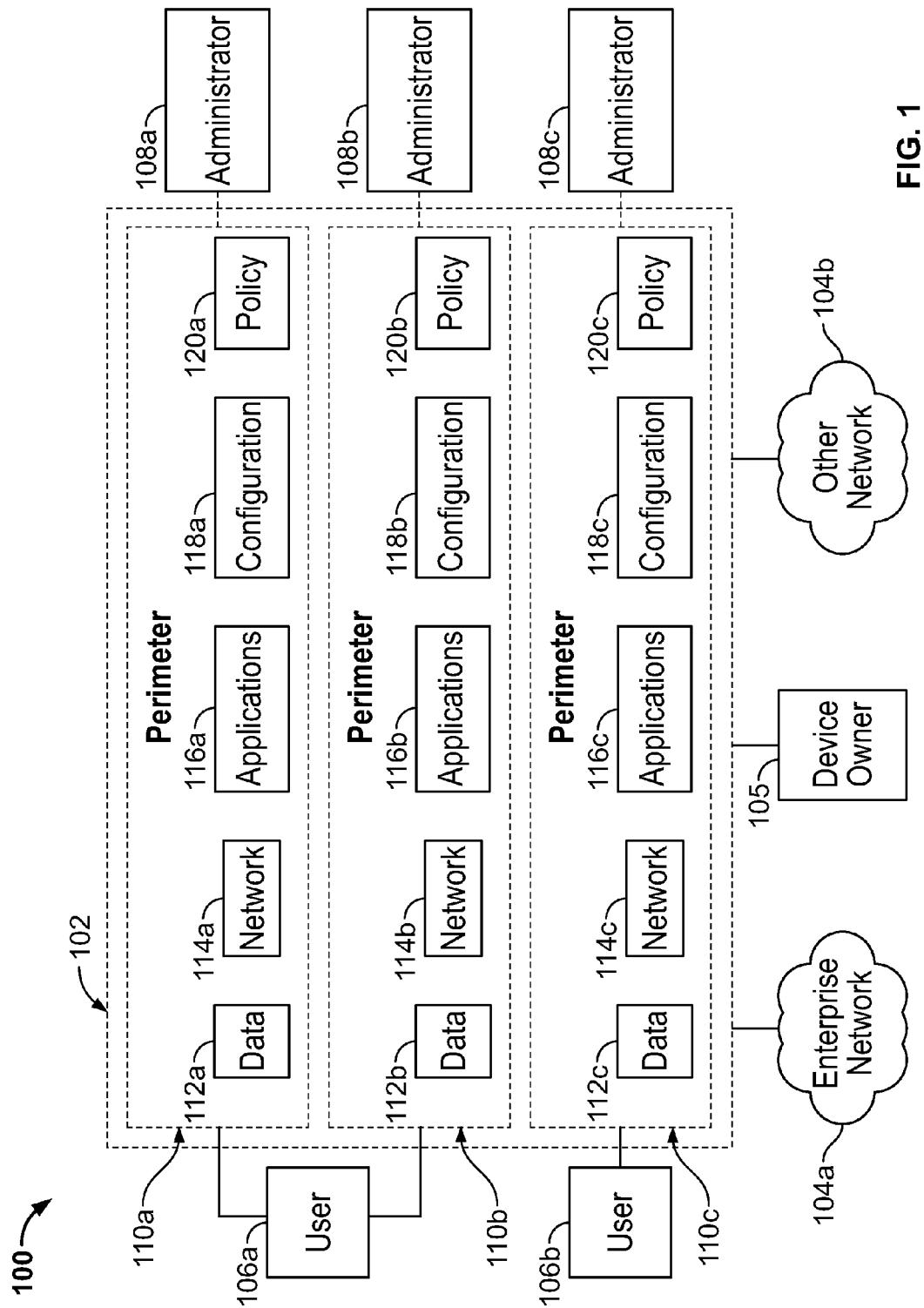
FIG. 1 is a schematic diagram showing an example data communication system.

Perimeters, as used in the present disclosure, generally refer to groups of resources having a common management scheme, and each perimeter generally includes one or more resources and one or more policies regarding use of or access to the one or more resources. Perimeters may be implemented on data communication systems that include a device, and can be used to logically separate information (e.g., files, applications, certificates, configuration data, network connections, data, and the like) on the device. For example, the device can implement two or more perimeters, which can include a personal perimeter, an enterprise or work perimeter, any suitable combination of these and other types of perimeters. In some embodiments, the device may include multiple personal perimeters, multiple enterprise perimeters, or both. A personal perimeter can be managed by a device user, and an enterprise perimeter can be managed by an enterprise or corporate administrator. In some implementations, the enterprise or corporate administrator can additionally manage the personal perimeter or the device or both. A device purchased, owned, or otherwise provided by an enterprise, employer or corporation may generally be referred to as a corporate-liable device, while a device purchased, owned or otherwise provided by an employee or individual may generally be referred to as a personal-liable device or an individual-liable device.

In some implementations, each perimeter on a device has its own file system on the device, and separation between perimeters can be provided, at least partially, by the separation of the file systems on the device. In some cases, some of the resources of each perimeter (e.g., data and policies) are stored in a dedicated file system for the perimeter, while other resource of each perimeter (e.g., applications) are stored outside of the dedicated file system.

Separation of file systems can be logical, physical, or both. A physical separation of file systems can be implemented, for example, by designating physically separate memory locations (e.g., separate memory devices, or separate blocks in the same memory) for each file system. A logical separation of file systems can be implemented, for example, by designating logically separate data structures (e.g., separate directories, etc.) for each file system. In some implementations, each file system has its own encryption parameters. For example, the file system for a corporate perimeter can have its own encryption key and a higher encryption strength, while a file system for a personal perimeter can have its own encryption key and lower encryption strength. In some instances, the file system for the personal perimeter has the same encryption strength as the corporate perimeter, or the file system for the personal perimeter can be unencrypted.

As described above, a perimeter can include a group of resources that share a common management scheme governing the use of resources in the group and can encompass both the resources and the management policies that describe how the resources may be used. The management policies can include security restrictions, which are defined for the perimeter. Applications executable by the device can include resources that, when executed, request access to other resources or provide resources to other applications (or both). For an application that is assigned to or associated with a perimeter, resources included in the application can be included in the group of resources included in the perimeter. Further, security restrictions defined for the perimeter can restrict the application to resources included in the group. Thus, when the application is executed within the perimeter, security restrictions included in the management policies of the perimeter can determine whether or not the resources associated with the application can access other resources, such as resources included in the group or resources outside the group (or both), or grant access to other applications, such as applications assigned to or associated with or not assigned to or associated with the perimeter (or both).

When a resource (e.g., an application) is "launched into" a perimeter, an instance of the application is instantiated in the perimeter. The management policy of the perimeter where an application is launched can determine, at least partially, what resources (e.g., data resources, network resources, etc.) the application can access or execute. As such, when an instance of application is running in a perimeter, permissions for the instance of the application are determined based at least partially on the management policy of the perimeter. For some applications, access to resource outside a perimeter can be determined, at least partially, based on the policies of the other perimeter.

In some implementations, a secure perimeter can divide or segregate different categories of data (e.g., work data, personal data, etc.) from the operating system level all the way to the user interface. As such, the perimeter architecture can provide protection of data at the operating system level, the file level, the user interface level, and other levels of the device. A secure perimeter can, in some cases, ensure a complete separation between the different categories of data, applications and the user experience, while at the same time also allowing the different categories of data to co-exist in the same application and share data when desired. A secure perimeter can allow for "hybrid apps," such as, for example, a unified inbox showing both personal and corporate email. In some instances, applications can be limited to an individual perimeter view (e.g., a "work" or "personal" perimeter view). For example, a social networking application can be configured to appear only in the personal perimeter. In some instances, separate instances of the same application can run in multiple perimeters. For example, a device can have an instance of a social networking application (e.g., Facebook, Twitter, etc.) running in a personal perimeter for a user's personal account, and the device can have an instance of the same social networking application running in a corporate perimeter for the user's company or the user's corporate account.

A device can include categories of applications installed on and executable by a device included in a data communications system. The system provides varying degrees of secure access to data available through the device. In some instances, each application is executable within one or more perimeters installed on the device in a controlled access environment defined and scoped by user choices or enterprise policies (or combinations of them). In some implementations, multiple versions of the same application can be installed in respective perimeters, each executable and being granted access to data within the respective perimeter. Some applications can be installed without being associated to any perimeter allowing the application to be executed and to access data within a perimeter within which the application is launched. Some applications can be executable to access multiple perimeters concurrently. In some implementations, applications can be installed within a perimeter with capabilities that extend the application's access to data outside the perimeter.

User preferences can define capabilities and permissions to be granted to applications executed within one or more perimeters or security restrictions on the device. For example, a user preference can be configured for device encryption, secure digital (SD) card encryption, password timeouts, restricting permission to camera access, and the like. Similarly, enterprise policies can define rules around data management on the device, password rules, and the like. As between a user preference and an enterprise policy, the device can implement a stricter rule. For example, if the enterprise policy requires SD card encryption but the user preference does not specify such encryption, then the device can implement SD card encryption. Similarly, if the enterprise policy establishes an idle time of at least 5 minutes and the user preference sets a timeout of 2 minutes, then the device can implement the user preference over the enterprise policy. In this manner, fine grain control of a device can be implemented to affect device functionality by applying rules and user choices. Such granularity of control implemented by the device platform with no knowledge of application developers can render a device platform flexible, while maintaining device security.

FIG. 1 is a schematic diagram showing an example data communication system 100. The example data communication system 100 includes a device 102, an enterprise network 104a, and one or more other networks 104b. A data communication system in accordance with other embodiments may include additional, different, or fewer features, as appropriate. The diagram in FIG. 1 also shows interactions by users 106a, 106b, by a device owner 105, and by administrators 108a, 108b, 108c. In some cases, the device owner 105 can be one of the users 106a or 106b, a business enterprise, or another entity. Additional, different, or fewer entities may interact with a data communication system, as appropriate in various implementations.

The device 102 can be any suitable computing device. Generally, a computing device includes a computer-readable medium and data processing apparatus. The computer-readable medium may include any suitable memory, disc, storage device, or other apparatus configured to store machine-readable information. The computer-readable medium can store instructions that are executable by the data processing apparatus. The data processing apparatus can include any suitable processor, controller, circuitry, or other apparatus configured to perform operations based on machine-readable instructions. The data processing apparatus can include a programmable processor, digital logic circuitry, firmware, or any other suitable device. The computer-readable medium can include a single medium or multiple media, and the data processing apparatus can include a single apparatus or multiple apparatus.

The example device 102 is operable to receive requests from the user via a user interface, such as a graphical user interface or any other suitable user interfaces. As shown in FIG. 1, the device 102 is communicably coupled to the enterprise network 104a and to one or more other networks 104b. The example device 102 is operable to receive, transmit, process and store any appropriate data. For example, the device 102 can comprise a smartphone, a tablet computer, a personal computer, a laptop computer, a personal data assistant (PDA), or another type of device. The device 102 may include an input device, such as a keypad, touch screen, mouse, or other device that can accept information, and an output device (e.g., display screen) that conveys information associated with the operation of the resources. Both the input device and output device may include fixed or removable storage media (e.g., memory, etc.) to both receive input from and provide output to users through the display.

As shown in FIG. 1, the device 102 includes three example perimeters 110a, 110b, and 110c (individually and collectively referred to as "perimeters 110"). Each perimeter 110 includes data 112, network access resources 114, one or more applications 116, one or more configuration files 118, and one or more policies 120. A perimeter 110 may include only a subset of the illustrated resources, or a perimeter 110 may include additional or different resources.

The example perimeters 110 can logically separate resources (e.g., applications, data, network access resources, configuration files, etc.) such that resources in a given perimeter can, in some instances, be prevented from accessing resources included in a different perimeter. For example, personal resources in one perimeter may be prevented from accessing corporate resources in another perimeter, or vice-versa. In some cases, an enterprise may extend a secured perimeter on a single user device without interfering with the user's personal experience on the same device. The perimeters may also permit cross-perimeter access to resources. Access to perimeter resources may be controlled by defining, assigning or otherwise associating a policy to each perimeter.

A policy for a perimeter can be implemented in any suitable format, using any appropriate information. A policy can specify access to both the external resources (in another perimeter) that can be accessed by internal applications (running in the perimeter) and internal resources that can be accessed by external applications. For example, a given perimeter's policy may identify other perimeters that are accessible, internal resources that are not accessible to other perimeters, or both. A perimeter's policy may identify specific users that can or cannot access specified resources in the perimeter. In some implementations, the policies from both perimeters determine whether cross-perimeter access is granted, or, if there is a conflict, the strictest policy can be applied. In some implementations, the policy for one perimeter determines that an application in the perimeter is granted access to data in another perimeter. For example, an application in a first perimeter may be granted access to data in a second perimeter independent of the second perimeter's policies.

The perimeter architecture enables a logical separation of computing resources such that transferring data between perimeters and accessing resources of other perimeter can be controlled. Resources may include applications, file systems, network access, or other computer resources. In addition to enabling access to resources within a perimeter, the example data communication system 100 may include a policy that identifies specific external resources that a resource in a perimeter may access. The example data communication system 100 may manage a seamless user experience in which the perimeter concept is executed.

A perimeter 110 may include password protection, encryption, and other process for controlling access to resources assigned to the perimeter. A perimeter 110 may be generated by the device owner, a user, an administrator, or others. In some examples, the perimeter 110a may be a personal perimeter created for the user 106a and managed by the user 106a. In some examples, the perimeter 110b may be an enterprise perimeter created by an administrator 108b for an enterprise and may be managed by a remote management server. In addition, a given perimeter may be accessed by the device owner 105, a user, an administrator, or any suitable combination. In some implementations, each perimeter may be associated with a single user, and at least some users may access multiple device perimeters. For example, the first user 106a may access resources within both the perimeter 110a and the perimeter 110b, and the second user 106b may have access to only one perimeter 110c.

In some instances individual perimeters may be added, deleted, or modified. The device owner 105 may have the ability to add or remove individual perimeters 110 from the device 102. In some implementations, a user can create a perimeter. In some instances, an organization associated with the enterprise network 104a can send the device information identifying the initial resources (e.g., applications, policies, configurations, etc.) for a new perimeter. A perimeter administrator may assign policies for the perimeters and initiate perimeter updates. In some implementations, perimeter administrators can remotely lock and/or wipe a perimeter.

Information may be stored on the device 102 in any suitable memory or database module. Example memories include volatile and non-volatile memory, magnetic media, optical media, random access memory (RAM), read-only memory (ROM), removable media and others. The data 112 can include any suitable information. The device 102 can store various objects, including files, classes, frameworks, backup data, business objects, jobs, web pages, web page templates, database tables, repositories storing business or dynamic information, and any other appropriate information including any parameters, variables, algorithms, instructions, rules, constraints, or references thereto. The data 112 may include information that is associated with an application, a network, a user, and other information.

The network access resources 114 can include any suitable parameters, variables, policies, algorithms, instructions, settings, or rules for granting access to networks. For example, the network access resources 114a may include or identify firewall policies for accessing the enterprise network 104a. As another example, the network access resources 114b may include or identify account data for accessing one or more of the other networks 104b. In some implementations, network access resources include or otherwise identify one or more of the following: a username; a password; a security token; a Virtual Private Network (VPN) configuration; firewall policies; a communication protocol; encryption key certificate; or others.

The applications 116 can include any suitable program, module, script, process, or other object that can execute, change, delete, generate, or process information. For example, applications can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the device 102, one or more processes associated with the applications 116 may be stored, referenced, or executed remotely. For example, a portion of the applications 116 may be an interface to a web service that is remotely executed. Moreover, the applications 116 may be a child or sub-module of another software module (not illustrated).

The configuration files 118 can include any suitable parameters, variables, policies, algorithms, instructions, settings, or rules for configuring software of the device 102. For example, the configuration files 118 may include a table that identifies settings for one or more applications 116. In some implementations, the configuration files 118 identify initial settings for one or more applications 116, and for other types of applications such as operating system settings. The configuration files 118 may be written in any suitable format, such as, for example, ASCII and line-oriented, etc.

The policies 120 may include any parameters, variables, policies, algorithms, instructions, settings, or rules for enabling or preventing access to resources in one or more perimeters. For example, the policies 120a may identify a resource external to the perimeter 110a that is accessible by a resource inside the perimeter 110a. A policy of a given perimeter may include or otherwise identify the accessibility of the perimeter generally, the accessibility of specific resource in the perimeter, the ability of resources in the perimeter to access other perimeters, and other accessibility information. A policy may specify accessibility by user, action type, time period, or otherwise. In some implementations, a policy may identify specific resources of a perimeter that are accessible to external resources. For example, the policies 120a for the perimeter 110a may indicate that a specific application in another perimeter 110b may or may not access the data or resources in the first perimeter 110a. As another example, the policies 120a for the perimeter 110a may indicate that any of the applications in the other perimeters 110b or 110c may or may not access the data or resources in the first perimeter 110a.

In some implementations, policies 120 may define or otherwise identify a process for user authentication. For example, the policies 120 may identify the type and content of user authentication (e.g., password strength, lifecycle) to apply to a cross-perimeter request. When a user provides a request to access to multiple perimeters, the request may be evaluated by the policies of both perimeters. In some instances, if both policies grant access, then the cross-perimeter request may be granted. The policies may identify or include information to determine which network access resources can be used by an external resource in a different perimeter.

The device 102 may be connected to multiple networks, such as the enterprise network 104a and the other networks 104b. The enterprise network 104a can include a wireless network, a virtual private network, a wired network, or any suitable network. The enterprise can be a corporate or business entity, a government body, a non-profit institution, or any other organization. The enterprise may be the device owner 105. The enterprise may also lease the device 102 or may hire contractors or agents who are responsible for maintaining, configuring, controlling, or managing the device 102. The other networks 104b can include any suitable networks that are accessible by a user. For example, the other networks can include a public network that the user has an account for, a private network, an ad hoc network, or another type of network. In some cases, the other networks 104b include a cellular data network. In some cases, the other networks 104b include a user's home network.

The networks 104a and 104b facilitate communication with the device 102. Either of the networks 104a and 104b may communicate, for example, Internet Protocol (IP) packets, Frame Relay frames, Asynchronous Transfer Mode (ATM) cells, voice, video, data, and other suitable information between network addresses. In addition, while the enterprise network 104a and the other networks 104b are each illustrated as a single network, each network may include multiple networks and may provide access to additional networks. In short, the enterprise network 104a and the other networks 104b may include any suitable network configured to communicate with the device 102.

Figure 2:
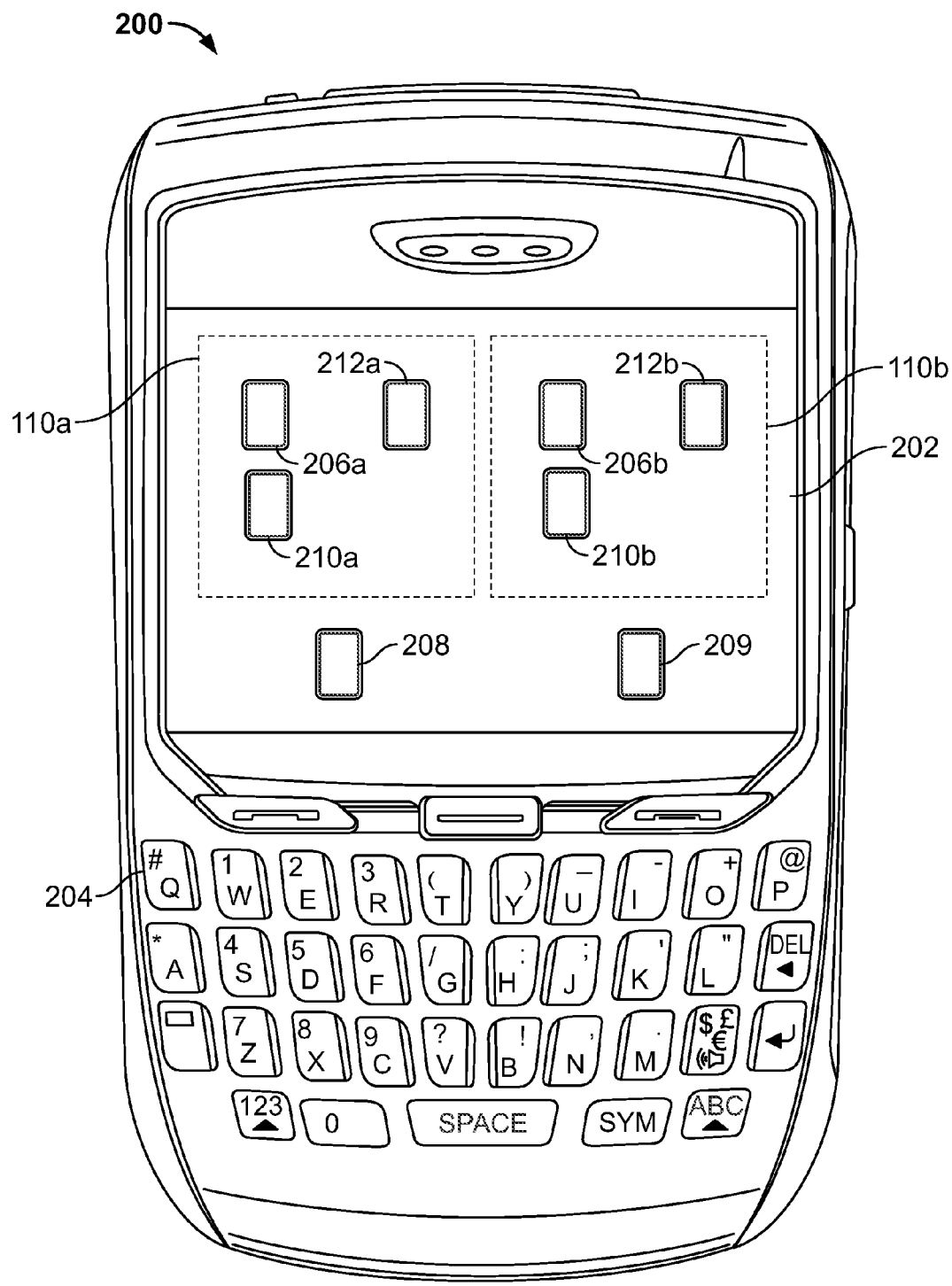
FIG. 2 is a diagram showing an example mobile device.

FIG. 2 is a diagram showing an example mobile device 200, which includes a display 202, an optional keyboard 204, and additional features. A device may include additional or different features. A hierarchy of applications can be installed on the device 200. Each application can be executed by the device 200 to collectively provide varying degrees of secure access to data available through the device 200. The hierarchy of applications can be categorized to include single-perimeter applications (for example, represented by objects 206a and 206b, which may comprise graphical icons, for example), dual-perimeter applications (for example, represented by objects 210a and 210b), and hybrid applications (for example, represented by objects 208 and 209).

A single-perimeter application can be assigned to or associated with a specific perimeter, such as a personal perimeter or an enterprise perimeter, at the time of installation on the device 200. The single-perimeter application's permissions and access authorizations are consequently determined by the perimeter to which the application is assigned at installation. If the application is assigned to or associated with the personal perimeter at the time of installation, then an object 206a representing the application can be displayed within the personal perimeter 110a. As another example, if the application is assigned to or associated with the enterprise perimeter at the time of installation, then an object 206b representing the application can be displayed within the enterprise perimeter 110b. The application can be subject to the macro-level perimeter rules and micro-level application rules set by an enterprise administrator. The enterprise administrator may not want a user-installed application (e.g., malware or otherwise) to access on-enterprise network resources, but may grant access to the enterprise network to certain other trustworthy applications.

Security restrictions defined by a perimeter can prevent single-perimeter applications from accessing data that is not assigned to or associated with the same perimeter to which the application is assigned. In some implementations, two versions of the same single-perimeter application can be installed on the device 200—a personal version assigned to the personal perimeter and an enterprise version assigned to the enterprise perimeter. For example, the personal version of the application can be downloaded from among multiple applications assigned to the personal perimeter and the enterprise version can similarly be downloaded from among multiple applications assigned to the enterprise perimeter. In such implementations, the object 206a and the object 206b can be concurrently displayed within the perimeter 110a and the perimeter 110b, respectively. The personal version and the enterprise version are executable only within the personal perimeter and the enterprise perimeter, respectively. In some implementations, the device 200 may execute only one instance of the single-perimeter application at a time. That is, the device 200 may be configured to not allow execution of both the personal version and the enterprise version of the single-perimeter application concurrently. Examples of applications that can be implemented as a single-perimeter application include game applications, social networking applications (e.g., Facebook, Twitter, etc.), expense-report applications, and others. In one embodiment, any third-party application (e.g., an application provided by a party other than the device manufacturer) may be implemented as a single-perimeter application.

Third party applications, i.e., applications other than those provided by manufacturers of the device 200, can always be single-perimeter applications. But, these applications need not be perimeter aware, and can be installed to either the personal perimeter or the enterprise perimeter. When installed to either the personal perimeter or the enterprise perimeter, the applications can be installed as two difference instances of the same application, i.e., a personal version and an enterprise version, which can be managed separately.

Another category of perimeter-based applications are dual-perimeter applications. (Here, the term dual-perimeter is used since the current example embodiment includes two perimeters; however, more than two perimeters may be provided in other embodiments, and the term any multi-perimeter may be used in such embodiments). Dual-perimeter applications can be installed without being assigned to or associated with any particular perimeter at the time of installation on the device 200. Instead, a dual-perimeter application can be launched into any of the (e.g., two or more) perimeters on the device 200. For example, the dual-perimeter application can be pre-installed on the device 200 and can be launched either in the personal perimeter or in the enterprise perimeter. When launched in the personal perimeter, the object 210a that represents the application can be displayed within the perimeter 110a, and the application can be granted access to data and network resources assigned to the personal perimeter. Similarly, when launched in the enterprise perimeter, the object 210b that represents the application can be displayed within the perimeter 110b, and the application can access resources, such as data and network resources, assigned to the enterprise perimeter. In this sense, the dual-perimeter application can be assigned to a perimeter at launch time and at run time can access the resources, such as data and network resources, etc., of the perimeter to which it is assigned, but not the resources, such as data and network resources etc., outside of the perimeter to which it is assigned. Similarly to single-perimeter applications, the device 200 may be configured to not allow concurrent execution of a dual-perimeter application within more than one perimeter. In other words, at any given instance, the device 200 can allow only one instance of a dual-perimeter application to be executed within a perimeter. Examples of applications that can be implemented as dual-perimeter applications include document editing application (e.g., DocsToGo), application distribution applications (e.g., AppWorld), document reader applications (e.g., ADOBE® reader), picture applications, video applications, map applications, navigation applications, and others.

In some implementations, if the dual-perimeter application is executing within a perimeter, then the object representing the application can be displayed only within the perimeter and not within other perimeters. Alternatively, the object representing the dual-perimeter application initially can be displayed outside all the perimeters. In response to a selection of the object from within a perimeter, the application can be executed within the perimeter. Examples of dual-perimeter applications can include document editing applications. When executed within a personal perimeter, the device 200 can restrict the document editing application to only accessing resources within the personal perimeter and not the resources within the enterprise perimeter; in other words, the device 200 can restrict the document editing application to resources within the personal perimeter while not allowing access to the resources within the enterprise perimeter. Conversely, when executed within an enterprise perimeter, the device 200 can restrict the document editing application to resources within the enterprise perimeter but not the resources within the personal perimeter.

A further category of perimeter-based applications are hybrid applications. Hybrid applications may be configured to access resources assigned to multiple perimeters at the same time. Such applications can be aware of perimeter separation logic and perimeter run time state, and obscure data from protected perimeters when those perimeters are locked, for example, due to password protection or inactivity. Hybrid applications can distinguish between data sourced from different perimeters and can maintain all of their access to the various sources of data separate from each other, thereby maintaining the integrity of the perimeter separation on the device 200. Because the hybrid application can be assigned to or be associated with multiple perimeters at the same time, objects representing hybrid applications (for example, objects 208, 209) can be displayed outside all the perimeters (for example, perimeters 110a, 110b).

An example of a hybrid application can be a calendar application that can enable a user to manage events on a calendar. The calendar application is a hybrid application because it can access data (i.e., data related to events, etc.) from the user's personal calendar and from the user's enterprise (i.e., work) calendar. To maintain the integrity of the perimeter separation on the device 200, the calendar application can obfuscate data assigned to one perimeter when executed within another perimeter. That is, if the calendar application is executed within the personal perimeter to schedule an event on the personal calendar, then the calendar application can display a conflicting event on the enterprise calendar without displaying details of the conflicting event. For example, the calendar application can display the conflicting event as a blank object in the personal calendar. In this manner, the hybrid applications can provide functionality that can unify the view of data sourced from different perimeters while maintaining their separation for security integrity. Examples of applications that can be implemented as hybrid applications include e-mail applications (e.g., a unified Inbox), contacts applications, calendar applications, unified search applications, tasks/memos applications, phone applications, and others.

In some implementations, an application can be assigned to a perimeter and have capabilities that extend beyond the assigned perimeter. Any suitable application (including the categories of applications described above) can be given such extended capabilities. In some instances, applications with such extended capabilities can be considered a separate category of applications. In some implementations, an object representing the application can be displayed within the perimeter to which the application is assigned (for example, object 212a within perimeter 110a or object 212b within perimeter 110b). As shown in FIG. 2, an extended capabilities application can be presented in the same manner as a single-perimeter or dual-perimeter application; or an extended capabilities application can be presented in a different manner. Such an application can be assigned to a perimeter at the time of installation and can be granted access to data and network resources outside the perimeter to provide useful functionality. In some embodiments, extended capabilities perimeter applications can include certain core applications developed by the manufacturer of the device. Some examples of extended capabilities perimeter applications include a short message service (SMS) application, a telephony application, a caller ID application, social networking applications (e.g., Facebook, Twitter, etc.), maps applications, navigation applications, and others. In some embodiments, extended capabilities perimeter applications can include any applications that require access to contacts. In some embodiments, extended capabilities perimeter applications can include applications that are provided by the manufacturer of the device.

In some implementations, extended capabilities applications have access to resources of a locked perimeter. Data associated with a perimeter may be generally inaccessible when the perimeter is locked. In some instances, an extended capabilities application associated one perimeter can access data from another perimeter even when the other perimeter is locked. For example, in some implementations, an enterprise perimeter may be locked due to a manual lock or an inactivity timeout or other lock trigger, and the enterprise perimeter may be unlocked by an authentication process such as receiving an appropriate password, gesture, biometric data, or other authentication token. A phone application receiving an incoming call from a contact that is associated with the enterprise perimeter can access the contact information associated with the enterprise perimeter even though the enterprise perimeter is locked. The phone application can then provide caller ID information about the caller even while the enterprise perimeter is locked.

Referring again to FIG. 2, when the device 200 stores contact information within the enterprise perimeter 110b, the device 200 can designate the contact information as being of a type accessible by the telephony application. The device 200 can execute the telephony application within the personal perimeter 110a to receive an incoming call. If the telephony application is an extended capabilities perimeter application, the device 200 can execute the telephony application to access data and network resources assigned to the enterprise perimeter 110b independent of the management policy of the enterprise perimeter 110b. This can allow the telephony application to be executed within the personal perimeter 110a and access a contact information assigned to the enterprise perimeter 110b.

Applications that are not hybrid are unaware of the perimeter to which the applications are assigned or with which the applications are associated. Such applications can be launched with no inherent knowledge about the separation between perimeters, for example, personal and enterprise perimeters. Such applications are given access to the data that the applications need or request (or both) based on the permissions provided to the applications at launch time. The permissions can be determined, for example, by at least one of the perimeter in which the application is installed at installation time, an enterprise management policy in effect, current user preferences in effect, or a combination of them. For example, the device 200 may not grant personal applications (i.e., applications assigned to or associated with the personal perimeter) access to work data (i.e., data assigned to or associated with the enterprise perimeter). The device 200 may grant enterprise applications (i.e., applications assigned to or associated with the enterprise perimeter) access to personal data (i.e., data assigned to or associated with the personal perimeter). In another example, the enterprise management policy may define that a specific application be allowed to access a specific functionality or a specific type of data or combinations of them. In a further example, the current user preference may be set such that a personal application can be used in a work network.

Figure 3:
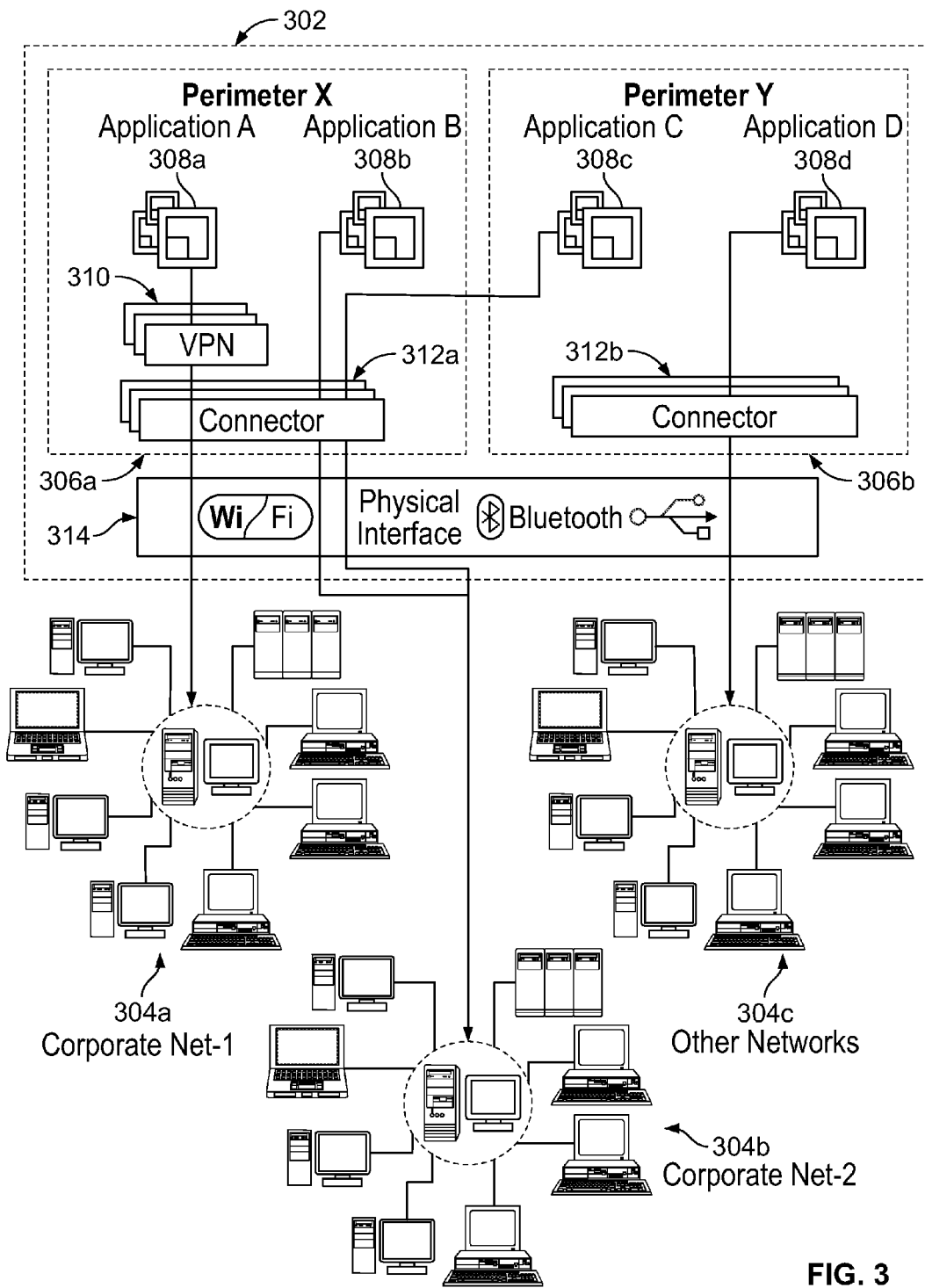
FIG. 3 is a schematic diagram showing example uses of resources on a mobile device.

FIG. 3 is a schematic diagram showing example uses of network resources by a mobile device. The example uses shown in FIG. 3 may occur at different times, or they may occur concurrently. In the example shown, the device 302 is configured to communicate with corporate networks 304a and 304b and a non-corporate network 304c. The corporate networks 304a and 304b can include a virtual private network of an enterprise, a private Wi-Fi network of an enterprise, a wired network of the enterprise, or another network that is administered by the enterprise. The non-corporate network can include, for example, a publicly-accessible Wi-Fi network, a cellular data network, a personal wireless network, or another type of network. The device 302 includes an enterprise perimeter 306a and a personal perimeter 306b. The enterprise perimeter 306a includes the enterprise applications 308a and 308b, and the personal perimeter 306b includes the personal applications 308c and 308d. The enterprise perimeter 306a includes virtual private network data 310 and enterprise connection data 312a. The personal perimeter includes other connection data 312b.

The device 302 can access the corporate networks 304a and 304b using the network resources of the enterprise perimeter 306a, and the device can access the non-corporate network 304c using the network resources of the personal perimeter 306b. Each of the networks 304a, 304b, and 304c may, in some cases, provide access to other systems. For example, one or more of the networks 304a, 304b, and 304c may provide Internet access for the device 302. Some networks may only provide access to specific servers, databases, or systems. For example, the corporate network 304a may provide access only to corporate e-mail servers. The device 302 may be connected to any of the networks 304a, 304b, and 304c through any suitable component or components of the physical interface 314. The connection hardware may include, for example, hardware for a Wi-Fi connection, a cellular connection, Bluetooth, Universal Serial Bus (USB), Radio Frequency Identification (RFID), Near Field Communication (NFC), or other connection technologies.

The virtual private network data 310 provides secure connectivity with the corporate network 304a. In the example shown in FIG. 3, the virtual private network data 310 are used to route enterprise data traffic for the enterprise application 308a to the corporate network 304a. The enterprise connection data 312a in the enterprise perimeter 306a provides connectivity with the corporate network 304b, and the other connection data 312b in the personal perimeter 306b provides connectivity with other networks 304c. In the example shown in FIG. 3, the enterprise connection data 312a are used to route enterprise data traffic for the enterprise application 308b to the corporate network 304b, and enterprise connection data 312a are also used to route personal data traffic for the personal application 308c to the corporate network 304b. For example, the personal application 308c may be a web-based application (e.g., online game, social networking application) that accesses the Internet through the corporate network 304b. As shown in FIG. 3, the other connection data 312b are used to route personal data traffic for the personal application 308d to the other networks 304c.

In some implementations, the connection data 312a and 312b may include encryption information, network settings and information, passwords, certificates, and other data. Each perimeter may include a policy for applications and network resources within the perimeter, outside the perimeter, or both. The device 302 can include a policy (e.g., a policy assigned to the enterprise perimeter 306a) that allows corporate applications in the corporate perimeter 306b to access data (e.g., the other connection data 312b, or other data) in the personal perimeter 306b. Such access may be provided, in some instances, independent of a policy assigned to the personal perimeter 306b. Similarly, the device 302 can include a policy (e.g., a policy assigned to the personal perimeter 306b) that allows personal applications in the personal perimeter 306a to access data (e.g., the connection data 312a, or other data) in the enterprise perimeter 306a. Such access may be provided, in some instances, independent of a policy assigned to the enterprise perimeter 306a.

Figure 4:
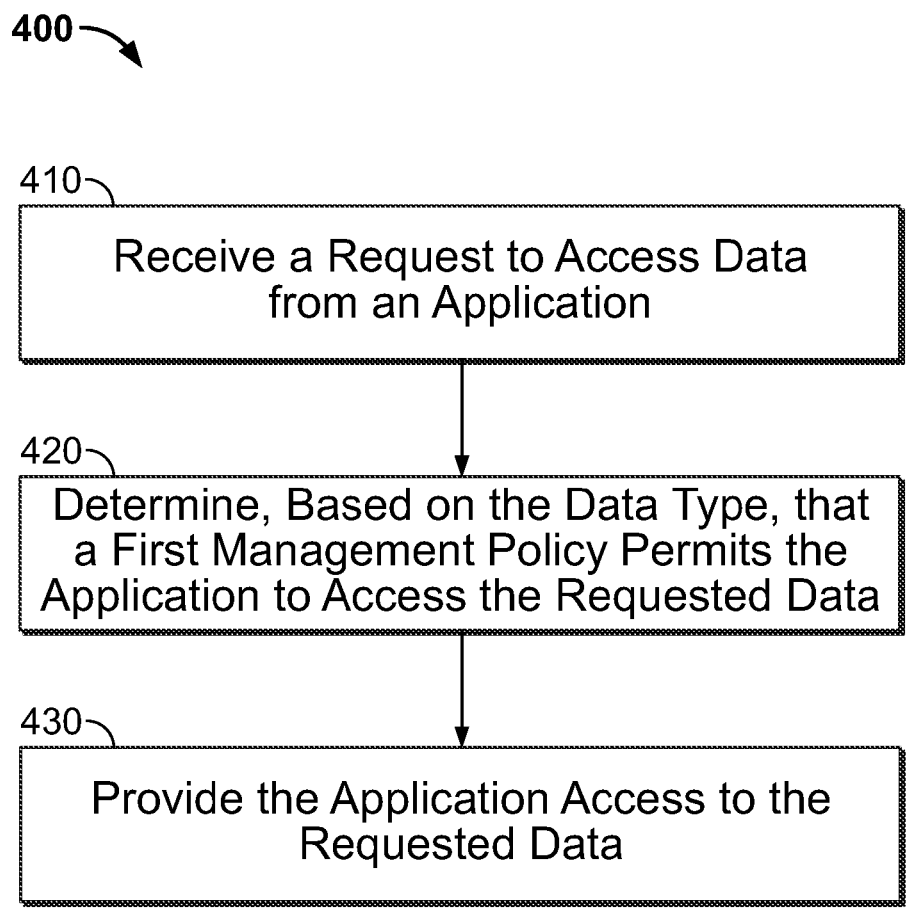
FIG. 4 is a flow chart showing an example process for managing data access on a mobile device.

FIG. 4 is a flow chart showing an example process 400 for managing application execution and data access on a mobile device. The process 400 can be implemented by a device in a communication system. For example, the process 400 can be implemented by the device 102 shown in FIG. 1, the device 200 shown in FIG. 2, the device 302 shown in FIG. 3, or by another type of system or module. The example process 400 shown in FIG. 4 can be implemented using additional, fewer, or different operations, which can be performed in the order shown or in a different order. In some implementations, one or more of the operations can be repeated or iterated, for example, until a terminating condition is reached.

The process 400 can be implemented on a device that includes multiple perimeters. For example, the example operations in the process 400 are described with respect to a first perimeter and a second perimeter. The perimeters can be defined and implemented in any suitable manner, and each perimeter may include any suitable data, applications, policies, and other resources. Each perimeter may include its own policy or other data that defines rules for accessing resources associated with the perimeter. For example, a first perimeter on the device may include a first policy that defines rules for accessing resources (e.g., applications, data, network resources, etc.) associated with the first perimeter, and the second perimeter may include a second policy that defines rules for accessing resources (e.g., applications, data, network resources, etc.) associated with the second perimeter. A device may include any suitable number of perimeters (e.g., 1, 2, 3, 4, or more).

In some implementations, the device includes a personal perimeter associated with a user of the device. A device may include multiple personal perimeters, and each personal perimeter can be associated with the same user, or they may each be associated with different users. For example, multiple users may be authorized to use the device, and each user may have his or her own personal perimeter on the device. In some implementations, the device includes an enterprise perimeter associated with an enterprise (e.g., business, corporation, partnership, or other enterprise). For example, the enterprise may own the device and assign the device to a particular user. An enterprise administrator may setup the device policies or configure the device for enterprise use. In some instances, the device includes multiple enterprise perimeters. Each enterprise perimeter can be associated with the same enterprise, or they may each be associated with different enterprises. For example, the user may own the device and have perimeters for each enterprise he or she is associated with.

At 410, the device receives a request to access data from an application assigned to a first perimeter on the device. The requested data is assigned to a second, different perimeter on the device and has a data type. As described below, the data type of the requested can be used to determine if the application assigned to the first perimeter can access the data assigned to the second perimeter. The first perimeter can include computing resources executable to control access of data within or outside the first perimeter by applications assigned to the first perimeter. The applications in the first perimeter may include any suitable applications (e.g., calendar, e-mail, games, tools, etc.). The application can be assigned to the first perimeter upon installing the application on the device. The second perimeter can include computing resources executable to control access to data assigned to the second perimeter. The network resources in the second perimeter may include any suitable network resources (e.g., virtual private network account, Wi-Fi access data, etc.).

The requested data can be assigned to the second perimeter upon storing the requested data on the device. In some implementations, the device 200 can execute the application assigned to the first perimeter (for example, the personal perimeter 110*a*) in response to input received either from the user or over the network or both. When the device 200 executes the application within the personal perimeter 110*a*, the application can request access to data assigned to a second perimeter different from the perimeter 110*a*, for example, the enterprise perimeter 110*b*. In some implementations, the request indicates a data type of the requested data. In some implementations, the data type can be determined from the requested data.

At 420, in response to the request to access data, the device determines, based on the data type, that a first management policy assigned to the first perimeter permits the application to access the requested data independent of a second, different management policy assigned to the second perimeter. The second management policy assigned to the second perimeter can be configured to deny access to the requested data by applications not assigned to the second perimeter. For example, the requested data, which can include work-related contact information, can be assigned to the second perimeter, namely, the enterprise perimeter 110*b*. The first management policy assigned to the first perimeter, namely, the personal perimeter 110*a*, can be configured to permit the application to access the requested data despite the management policy assigned to the enterprise perimeter 110*b*. In some cases, to do so, the device 200 can determine if the data is of the data type that is accessible to and capable of being consumed by an extended capabilities application. In some implementations, the management policy of the personal perimeter 110*a* indicates particular types of data (e.g., contact information) that are accessible to particular applications (e.g., a telephony application) independent of the perimeter to which the data is assigned.

The data type can be specified (e.g., explicitly or implicitly) in the request for the data. For example, if the request specifies a file name, the data type may be specified by the file name extension, by the directory where the data is stored, or by other aspects of the file name. The data type can be specified in the data itself or in metadata associated with the data. In some cases, telephone number, street address, electronic mail address, and the like can be labeled as a "contact information" data type. In some cases, information on appointments and meetings and the like can be labeled as a "calendar" data type. The data type can be determined by the type of application that created the data, by the format of the data, or other considerations. The data type can be specified by metadata, a file name extension, a file format, or another data feature.

At 430, in response to determining that the first management policy permits the application to access the requested data independent of the second management policy, the device provides the application access to the data. In some implementations, the device 200 can make the determination based on the data type of the requested data. In other words, the device 200 can determine that extended capabilities perimeter applications, such as the telephony application, can access data of the data type regardless of the perimeter to which the data is assigned. In contrast, management policies of perimeters to which applications that are not extended capabilities perimeter applications are assigned—such as a single-perimeter or dual-perimeter application—may restrict access to data of the data type that is assigned to other perimeters. When the device 200 determines that the application requesting data of the data type is an extended capabilities perimeter application, then the device 200 can provide the application access to the requested data of the data type.

In general, some aspects of the subject matter described here can be implemented as a computer-implemented method to manage application execution and data access on a mobile device. A request to access data is received from an application assigned to a first perimeter on a device. The data is assigned to a second, different perimeter on the device and has a data type. In response to receiving the request, it is determined, based on the data type, that a management policy assigned to the first perimeter permits the application to access the requested data independent of a second, different management policy assigned to the second perimeter. In response to the determining, the application is provided access to the data.

Implementations of these and other aspects may include one or more of the following features. The second management policy assigned to the second perimeter can be configured to deny access to the requested data by applications not assigned to the second perimeter. The first management policy assigned to the first perimeter can be configured to permit the application to access the requested data despite the second management policy assigned to the second perimeter. The application can be assigned to the first perimeter upon installing the application on the device. The requested data can be assigned to the second perimeter upon storing the requested data on the device. The first management policy assigned to the first perimeter can be configured to permit applications assigned to the first perimeter to access personal data on the device. The requested data can include work-related contact information. The application can be a telephony application. The request to access the work-related contact information can be received from the telephony application. The requested work-related contact information can be provided to the telephony application. The first perimeter can include computing resources executable to control access of data within or outside the first perimeter by applications assigned to the first perimeter. The second perimeter can include computing resources executable to control access to data assigned to the second perimeter.

A number of implementations have been described. Nevertheless, it will be understood that various modifications may be made. Other variations in the order of steps are also possible. Accordingly, other implementations are within the scope of the following claims.

What is claimed is:
1. A method comprising:
    configuring a first management policy associated with a first perimeter on a device to permit an application associated with the first perimeter to access a type of data associated with a second, different perimeter on the device, the first management policy being configured to permit access to the type of data independent of a second, different management policy associated with the second perimeter, the second management policy being configured to deny access to the data by applications not associated with the second perimeter.

2. The method of claim 1, comprising configuring the first management policy associated with the first perimeter to override the second management policy associated with the second perimeter.

3. The method of claim 1, further comprising associating the application with the first perimeter upon installing the application on the device.

4. The method of claim 1, further comprising associating the data with the second perimeter upon storing the data on the device.

5. The method of claim 1, further comprising configuring the first management policy associated with the first perimeter to permit applications associated with the first perimeter to access personal data on the device, and wherein the data includes work-related contact information.

6. The method of claim 5, wherein the application is a telephony application, and wherein the method further comprises:
  receiving a request to access the work-related contact information from the telephony application; and
  providing the requested work-related contact information.

7. The method of claim 1, wherein the first perimeter includes computing resources executable to control access to data within or outside the first perimeter by applications associated with the first perimeter, and wherein the second perimeter includes computing resources executable to control access to data associated with the second perimeter.

8. The method of claim 1, wherein the first management policy is configured to permit the application to access the type of data associated with the second perimeter while the second perimeter is locked.

9. The method of claim 1, wherein the first perimeter comprises a personal perimeter and the second perimeter comprises an enterprise perimeter.

10. A device comprising:
  data processing apparatus operable to run an application associated with a first perimeter on the device; and
  a computer-readable medium storing a first management policy associated with the first perimeter, the first management policy configured to permit the application to access a type of data associated with a second, different perimeter on the device, the first management policy configured to permit the application to access the type of data independent of a second, different management policy associated with the second perimeter, the second management policy being configured to deny access to the data by applications not associated with the second perimeter.

11. The device of claim 10, wherein the first management policy associated with the first perimeter is configured to override the second management policy and to permit the application to access the data.

12. The device of claim 10, the application being associated with the first perimeter upon installing the application on the device.

13. The device of claim 10, the data being associated with the second perimeter upon storing the data on the device.

14. The device of claim 10, the first management policy being configured to permit applications associated with the first perimeter to access personal data on the device, wherein the data includes work-related contact information.

15. The device of claim 14, wherein the application is a telephony application, and wherein the device is configured to:
  receive a request to access the work-related contact information from the telephony application; and
  provide the requested work-related contact information.

16. The device of claim 10, wherein the first perimeter includes computing resources executable to control access to data within or outside the first perimeter by applications associated with the first perimeter, and wherein the second perimeter includes computing resources executable to control access to data associated with the second perimeter.

17. The device of claim 10, wherein permitting the application to access the type of data includes providing the application access to the type of data associated with the second perimeter while the second perimeter is locked.

18. A non-transitory computer-readable medium storing instructions executable by data processing apparatus to perform operations comprising:
  configuring a first management policy associated with a first perimeter on a device to permit an application associated with the first perimeter to access a type of data associated with a second, different perimeter on the device, the first management policy being configured to permit access to the data independent of a second, different management policy associated with the second perimeter, the second management policy being configured to deny access to the data by applications not associated with the second perimeter.

19. The medium of claim 18, the operations comprising configuring the first management policy associated with the first perimeter to override the second management policy.

20. The medium of claim 18, the operations further comprising associating the application with the first perimeter upon installing the application on the device.

21. The medium of claim 18, the operations further comprising associating the data with the second perimeter upon storing the data on the device.

22. The medium of claim 18, the operations further comprising configuring the first management policy associated with the first perimeter to permit applications associated with the first perimeter to access personal data on the device, and wherein the data includes work-related contact information.

23. The medium of claim 22, wherein the application is a telephony application, and wherein the operations further comprise:
  receiving a request to access the work-related contact information from the telephony application; and
  providing the requested work-related contact information.

24. The medium of claim 18, the operations comprising providing the application access to the type of data associated with the second perimeter while the second perimeter is locked.

* * * * *